United States Patent
Yang (10) Patent No.: US 8,866,744 B2
(45) Date of Patent: Oct. 21, 2014

(54) KEYBOARD HAVING TOUCH INPUT DEVICE

(75) Inventor: Yan-Mei Yang, Chiayi (TW)

(73) Assignee: HOWAY Corp., Kaohsiung (TW)

( * ) Notice: Subject to any disclaimer, the term of this patent is extended or adjusted under 35 U.S.C. 154(b) by 849 days.

(21) Appl. No.: 12/750,375

(22) Filed: Mar. 30, 2010

(65) Prior Publication Data

US 2011/0241997 A1 Oct. 6, 2011

(51) Int. Cl.
*G06F 3/02* (2006.01)
*G09G 5/00* (2006.01)
*G06F 3/041* (2006.01)
*H03K 17/975* (2006.01)
*G06F 3/0354* (2013.01)

(52) U.S. Cl.
CPC .......... *G06F 3/0213* (2013.01); *G06F 3/03547* (2013.01)
USPC ............................. 345/168; 345/173; 200/600

(58) Field of Classification Search
USPC ......................................................... 345/168
See application file for complete search history.

(56) References Cited

U.S. PATENT DOCUMENTS

| | | | | |
|---|---|---|---|---|
| 4,733,222 A | * | 3/1988 | Evans | 341/33 |
| 2004/0027341 A1 | * | 2/2004 | Derocher | 345/173 |
| 2007/0091070 A1 | * | 4/2007 | Larsen et al. | 345/168 |
| 2009/0295733 A1 | * | 12/2009 | Stenbroten | 345/168 |
| 2010/0097322 A1 | * | 4/2010 | Hu et al. | 345/173 |
| 2010/0259485 A1 | * | 10/2010 | Chuang | 345/173 |

* cited by examiner

*Primary Examiner* — Charles V Hicks
(74) *Attorney, Agent, or Firm* — David Ku (57) ABSTRACT

A keyboard having a touch input device includes a keyboard body and a touch input device. The touch input device is disposed on the keyboard body and is used in a digital input mode. The touch input device has a touch pad and a pattern layer. The pattern layer is bonded to a surface of the touch pad, and has a plurality of key indication areas. Each key indication area is corresponding to a key used in the digital input mode, for being recognized and selected by a user. In addition, through a switching module disposed on the keyboard, the digital input mode can be switched to a cursor control mode, a gesture control mode, or a handwriting input mode, thereby achieving a wide range of applications.

27 Claims, 12 Drawing Sheets

KEYBOARD HAVING TOUCH INPUT DEVICE

BACKGROUND OF THE INVENTION

1. Field of the Invention

The present invention relates to a keyboard, and more particularly to a keyboard having a touch input device, which uses the touch input device to replace a part of keys on the keyboard, so as to provide both keyboard input and touch input functions without increasing the size of the keyboard.

2. Related Art

With the progress of technologies, various computer-related devices become available in the modern life, among which personalized computer-related devices become indispensable for modern people in their daily lives. Taking personal computers as an example, with the advent of the information age and proliferation of networks, nowadays, people's demand on the retrieving, processing, and use of various types of information also grows rapidly.

Considering the manipulation and use of a computer, the most commonly used conventional devices are a keyboard and a mouse. At the very beginning, the keyboard and the mouse are both wired, that is, must be connected to a host of the computer through wires. Since the length of the wires is limited, the operation is inevitably restricted. In addition, besides the keyboard and the mouse, the host of the computer also needs to be connected to other related devices (for example, a power supply, a loudspeaker, and a screen) through wires, so that the wires often become entangled, resulting in a mess.

In order to alleviate the above disadvantages, with the development of wireless technologies, some manufacturers change the keyboard and the mouse into wireless ones. Thus, the problem in use caused by the wires is solved. However, two significant disadvantages are found for the wireless keyboard and wireless mouse in actual use.

Firstly, considering the space allocation, since the wireless keyboard and the wireless mouse are still two separate structures, a sufficient space must be provided to receive the two structures at the same time, so that a large space is inevitably occupied.

Secondly, considering the operation, when the wireless keyboard and the wireless mouse are two separate structures, a user has to change the hand in order to respectively manipulate the keyboard and the mouse, which results in inconveniences and constraints in use.

In addition, when the user intends to use the handwriting or gesture input mode, the input operation cannot be achieved by using the keyboard or the mouse. In this case, besides the keyboard and the mouse, other input devices (for example, a touch pad) are further required for implementing related input operations. However, the use of other input devices not only requires more space, but also brings trouble to the user in use.

In view of the above, in order to alleviate the disadvantages of the prior art and to integrate different input devices to achieve the maximum convenience in use while occupying the minimum space, the present invention is realized by the inventor through years of experience and continuous research and development and improvement.

SUMMARY OF THE INVENTION

Accordingly, the present invention is mainly directed to a keyboard having a touch input device, which uses the touch input device to replace a part of keys on the keyboard, so as to provide both keyboard input and touch input functions while maintaining an original size of the keyboard.

The present invention is further directed to a keyboard having a touch input device. The touch input device includes a touch pad and a pattern layer bonded to a surface of the touch pad. A plurality of key indication areas corresponding to keys used in a digital input mode is disposed on the pattern layer for being selected by the user.

The present invention is further directed to a keyboard having a touch input device, which includes a switching module. The switching module is disposed on a keyboard body, which enables the user to switch a digital input mode to other available modes, thereby achieving a wide range of applications.

In order to achieve the above objectives, the present invention provides a keyboard having a touch input device, which includes a keyboard body and a touch input device. The touch input device is disposed on the keyboard body and is used in a digital input mode. The touch input device has a touch pad and a pattern layer. The pattern layer is bonded to a surface of the touch pad, and has a plurality of key indication areas. Each key indication area is corresponding to a key used in the digital input mode, for being recognized and selected by the user.

In addition, the present invention further provides a keyboard having a touch input device, which includes a keyboard body, a touch input device, and a switching module. The touch input device is disposed on the keyboard body, and has a touch pad and a pattern layer. The pattern layer is bonded to a surface of the touch pad, for being operated and input by the user. The switching module is disposed on the keyboard body and is used for switching to any one of a digital input mode, a cursor control mode, a gesture control mode, or a handwriting input mode.

In the implementation, the pattern layer is preferably bonded to the surface of the touch pad by printing or laminating.

In the implementation, the touch pad is preferably a capacitive touch pad.

In the implementation, the touch pad further includes a light guiding layer and a light source located at a side edge of the light guiding layer. Thus, light rays emitted by the light source are guided to a surface of the touch pad, so as to achieve desired illumination or aesthetic effects.

In the implementation, the keyboard body preferably has an accommodation area and at least one first conductor. The touch pad is preferably accommodated in the accommodation area, and has a touch surface and at least one second conductor, in which a plurality of capacitive sensors is distributed on the touch surface, and the second conductor is electrically connected to the capacitive sensors.

In order to make the features and functions of the present invention more comprehensible, embodiments accompanied with figures are described in detail below.

DETAILED DESCRIPTION OF THE INVENTION

Figure 1:
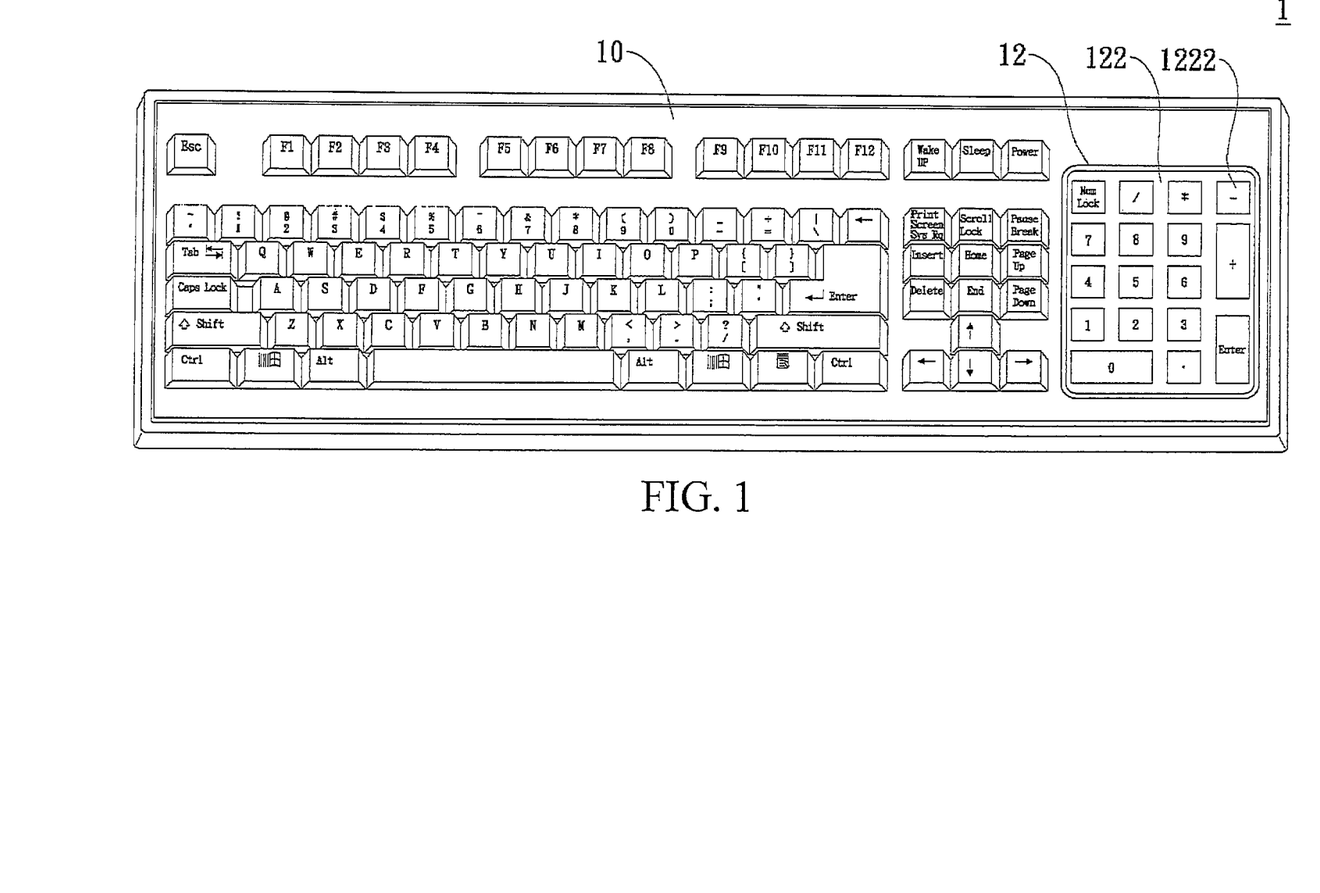
FIG. 1 is a top view of a first embodiment of the present invention.

FIG. 1 shows a first preferred embodiment of a keyboard 1 having a touch input device according to the present invention. In this embodiment, the keyboard 1 having a touch input device includes a keyboard body 10 and a touch input device 12. The touch input device 12 is disposed on the keyboard body 10 and is used and operated in a digital input mode.

The touch input device 12 includes a touch pad 120 and a pattern layer 122. The pattern layer 122 is bonded to a surface of the touch pad 120, and has a plurality of key indication areas 1222. Each key indication area 1222 is corresponding to a key on the keyboard used in the digital input mode, for being recognized and selected by the user. In other words, in this embodiment, the touch input device 12 replaces a numeric keypad area on an ordinary keyboard, and has a size equal to or smaller than the original numeric keypad area.

Figure 7:
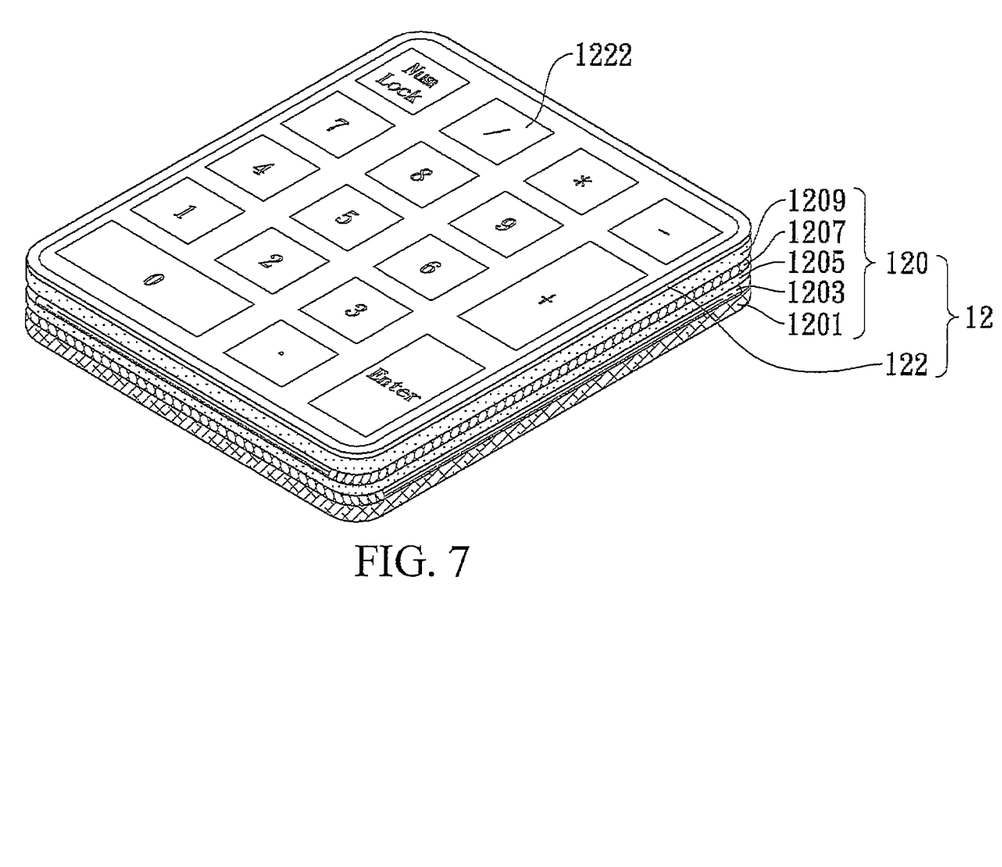
FIG. 7 is a schematic structural view of the touch input device according to the first embodiment of the present invention.

FIG. 7 is a three-dimensional exploded view of the touch input device 12. As shown in FIG. 7, the touch pad 120 includes, from bottom to top, a substrate layer 1201, a wire layer 1203 distributed along a Y axis, a middle insulating layer 1205, a wire layer 1207 distributed along an X axis, and a surface insulating layer 1209. In addition, in this embodiment, the pattern layer 122 is bonded to the surface insulating layer 1209 by laminating. When a conductor (for example, a finger of the user) touches the surface insulating layer 1209, the capacitance values among a plurality of X-axis wires and Y-axis wires below the surface insulating layer 1209 are changed. The change of the capacitance value of each wire can be measured by using a controller connected to the wires, and accordingly, XY components of the position of the conductor can be analyzed. Generally, the closer the wire is located to the conductor, the higher the capacitance value will be obtained.

Figure 2:
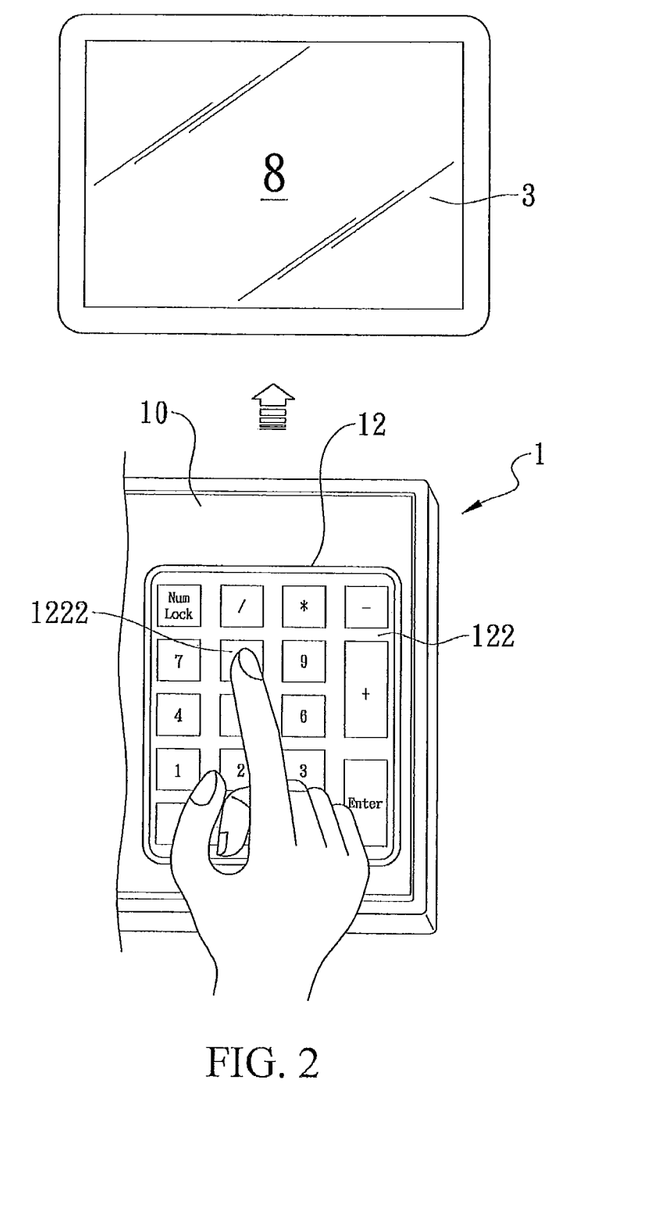
FIG. 2 is a using state diagram of a touch input device according to the first embodiment of the present invention.

FIG. 2 is a using state diagram of the touch input device 12 in this embodiment. As shown in FIG. 2, in operation, the input operation by pressing numerical keys can be realized through patterns displayed on the key indication areas 1222 of the pattern layer 122. At this time, the controller (located in the keyboard body, not shown) connected to the touch pad 120 recognizes the pressed key according to the touch position of the finger, for example, the number 8 shown in FIG. 2, and then an operating message of the key is output through an output terminal of the keyboard device.

FIGS. 3 to 6 show a second preferred embodiment of the keyboard having a touch input device according to the present invention. For ease of illustration, the same reference numbers are used to refer to structures the same as that of the first embodiment. The difference between this embodiment and the first embodiment is that, in this embodiment, besides the keyboard body 10 and the touch input device 12, the keyboard 1 having a touch input device further includes a switching module.

Figure 3:
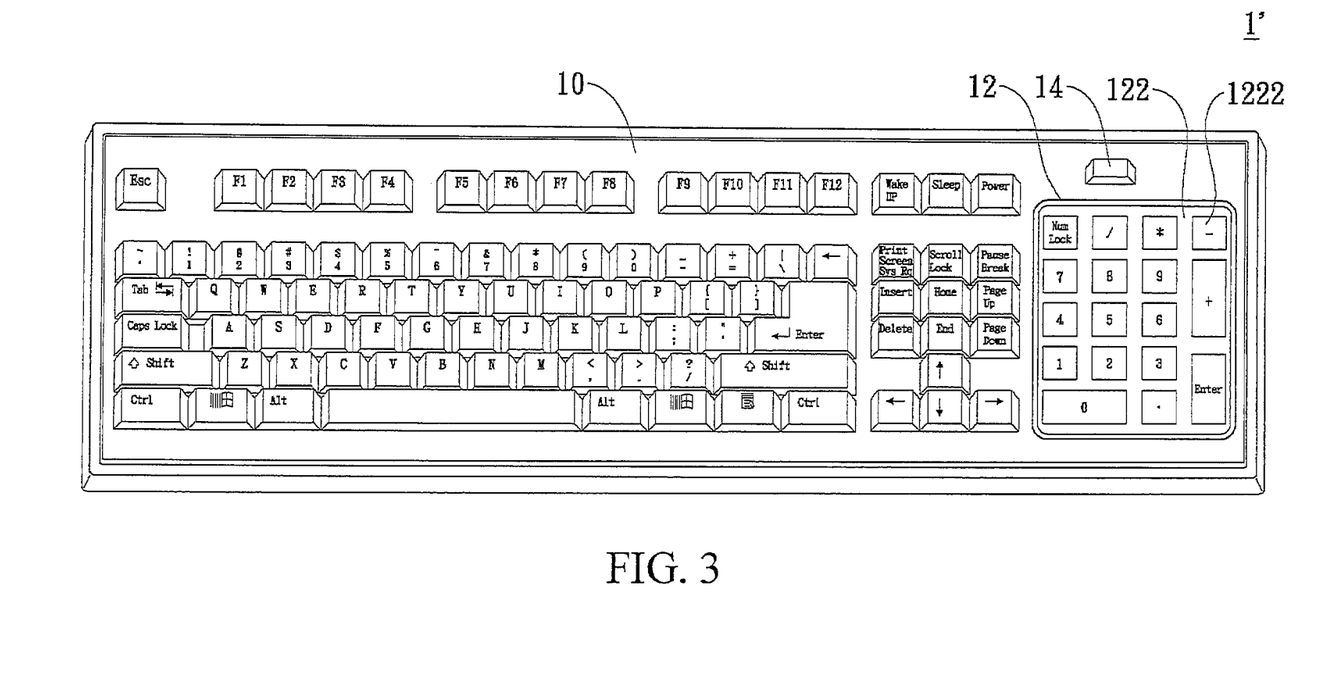
FIG. 3 is a top view of a second embodiment of the present invention.

As shown in FIG. 3, in this embodiment, the switching module has a switching key 14 disposed on the keyboard body 10, which enables the user to switch the digital input mode to other modes, for example, a cursor control mode, a gesture control mode, or a handwriting input mode.

Figure 4:
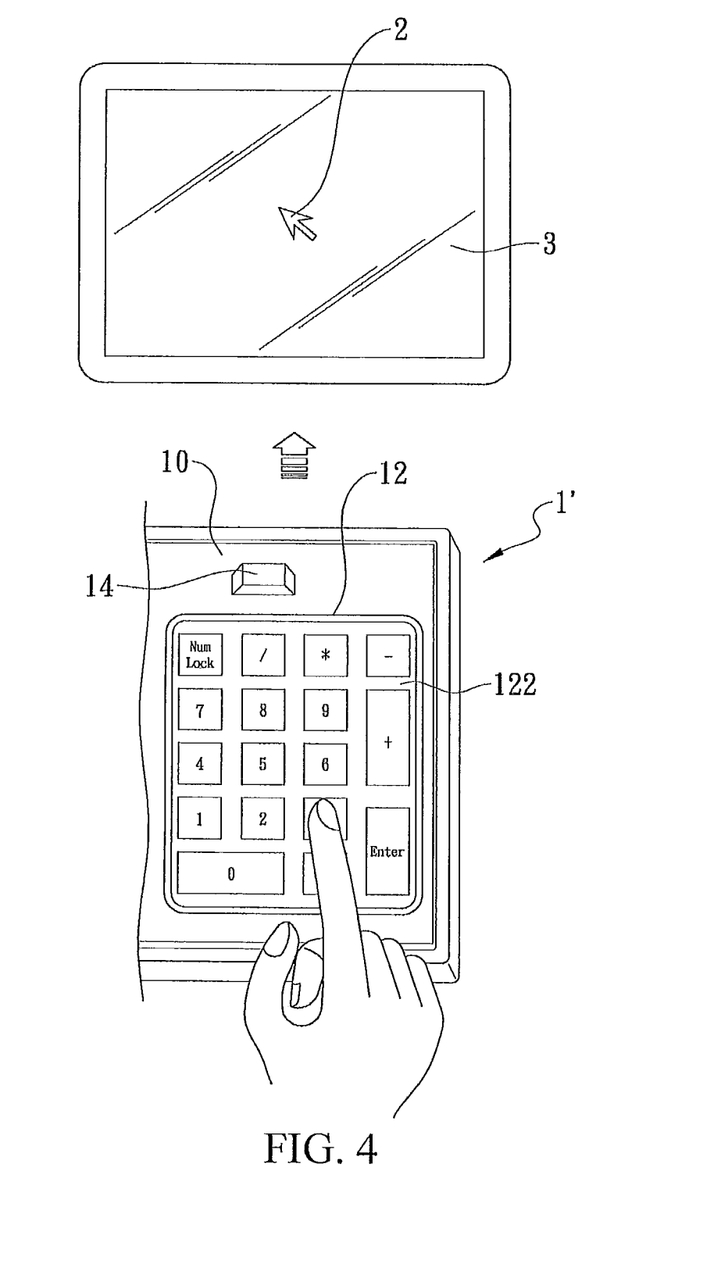
FIG. 4 is a using state diagram of a touch input device according to the second embodiment of the present invention.
Figure 5:
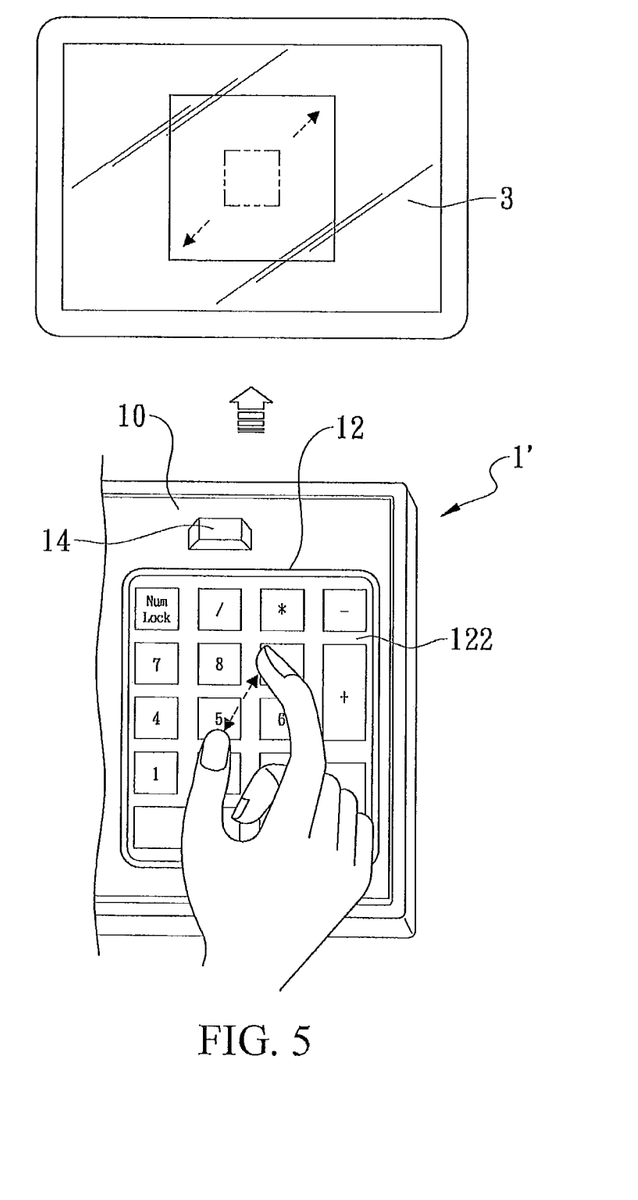
FIG. 5 is another using state diagram of the touch input device according to the second embodiment of the present invention.
Figure 6:
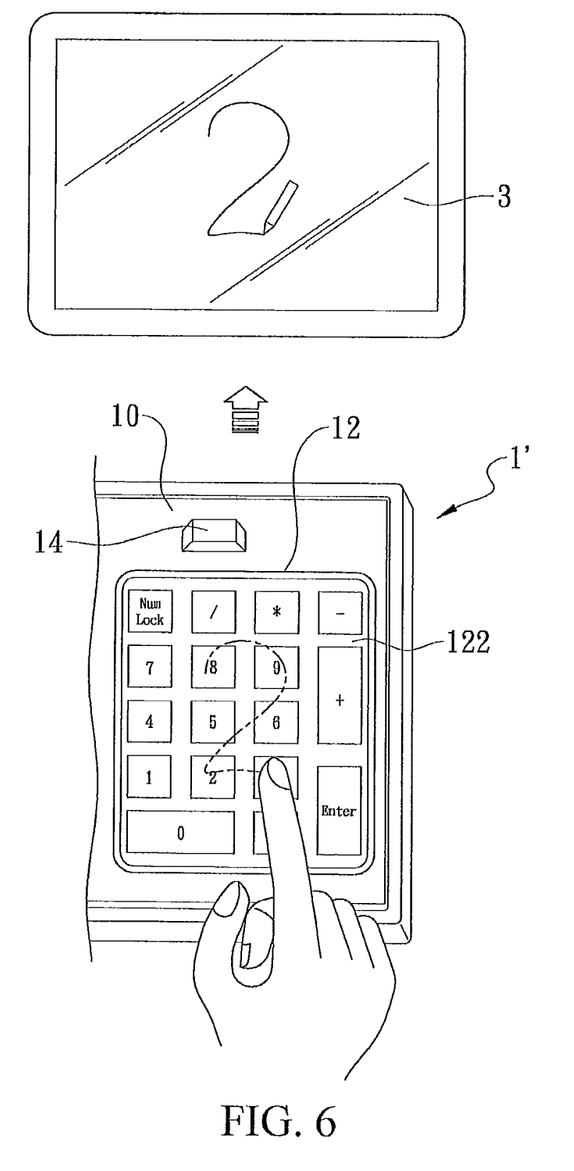
FIG. 6 is another using state diagram of the touch input device according to the second embodiment of the present invention.

FIGS. 4 to 6 are different using state diagrams of the touch input device 12 according to the second embodiment of the present invention. Taking FIG. 4 as an example, when the switching key 14 is selected, the currently used digital input mode may be switched to a cursor control mode. In this case, the user may put a finger on the touch pad 120 to move a cursor 2 on a screen 3, so as to realize the mouse manipulation.

FIGS. 5 and 6 respectively show the using states in a gesture control mode and a handwriting input mode. As shown in FIG. 5, when the switching key 14 is used to switch to the gesture control mode, the user can use the touch pad 120 to zoom in or zoom out, for example, an image file by relatively moving the fingers (for example, in FIG. 5, two fingers are respectively moved towards opposite directions), or to manipulate a multimedia play interface by making motions such as clockwise and counterclockwise circling, arrows, and multi-finger clicks. As such, the keyboard itself does not need to be additionally provided with any function key or hot key for operating the multimedia interface. Thus, the functional extension of the keyboard does not need to increase the range and setting of physical keys any more, and meanwhile, the customization effects can be achieved without changing the configuration and printing of function keys.

In addition, as shown in FIG. 6, after the touch input device is switched to the handwriting input mode, the user may directly use a finger or special pen to write on the touch pad 120, thereby achieving an input function of a writing pad. The keyboard may output a handwriting track detected on the touch pad 120 for subsequent handwriting recognition, and may also have handwriting recognition logic built in the controller of the touch pad, so as to recognize handwritten characters, patterns, or numbers in real time, and then output the recognized result.

The number of the switching key 14 is not limited to one as shown in the figures, but a plurality of switching keys 14 corresponding to different modes may be configured for realizing the switching function.

Figure 8:
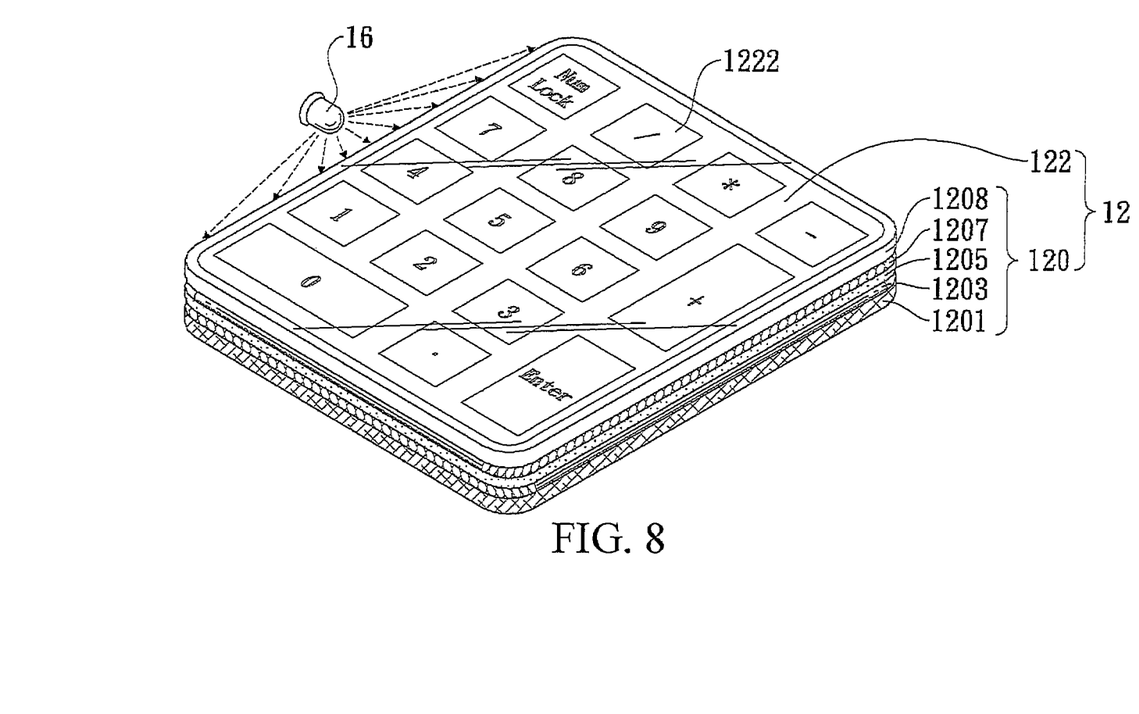
FIG. 8 is a schematic structural view of a touch input device according to a third embodiment of the present invention.

FIG. 8 shows a third preferred embodiment of the keyboard having a touch input device according to the present invention. For ease of illustration, the same reference numbers are used to refer to structures the same as that of the first embodiment. Compared with the first embodiment, in this embodiment, besides the keyboard body 10 and the touch input device 12, the keyboard having a touch input device further includes a light source 16; and the pattern layer 122 of the touch input device is printed on a surface of the touch pad 120.

As shown in FIG. 8, the light source 16 is disposed adjacent to a side edge of a surface insulating layer 1208. In this embodiment, the surface insulating layer 1208 of the touch pad 120 is a light guiding layer. Thus, when the light source 16 emits light rays toward the insulating layer, the emitted light rays illuminate the surface insulating layer 1208, so as to achieve the surface illumination or aesthetic effect on the touch input device 12.

In the implementation, the surface insulating layer 1208 may be directly replaced by a light guiding plate formed by a light-transmissive plastic sheet having a high dielectric constant, and then several light-emitting diode (LED) lamps are placed around the surface insulating layer 1208, so as to illuminate the entire surface insulating layer 1208. In addition, a desired pattern may be plated or printed on an upper surface of the surface insulating layer 1208 (that is, the light guiding plate), and then the portions that need to emit light rays are hollowed out; alternatively, a layer of Mylar polyester film may be adhered to the surface of the light guiding plate, and then a pattern required to be hollowed out is engraved.

If the pattern layer is bonded to the upper surface of the surface insulating layer 1208 (that is, the light guiding plate) by printing, the lines of numbers or lattices on the printed pattern layer may be hollowed out at this time to expose the light source below the light guiding plate, so as to enable the numbers or lattices to emit light rays. In the implementation, the LED light source may be designed to emit light rays only when being switched to the digital input mode. In this way, when seeing that the numbers are emitting light rays, the user may confirm that the touch input device has been successfully switched to the digital input mode.

Figure 9:
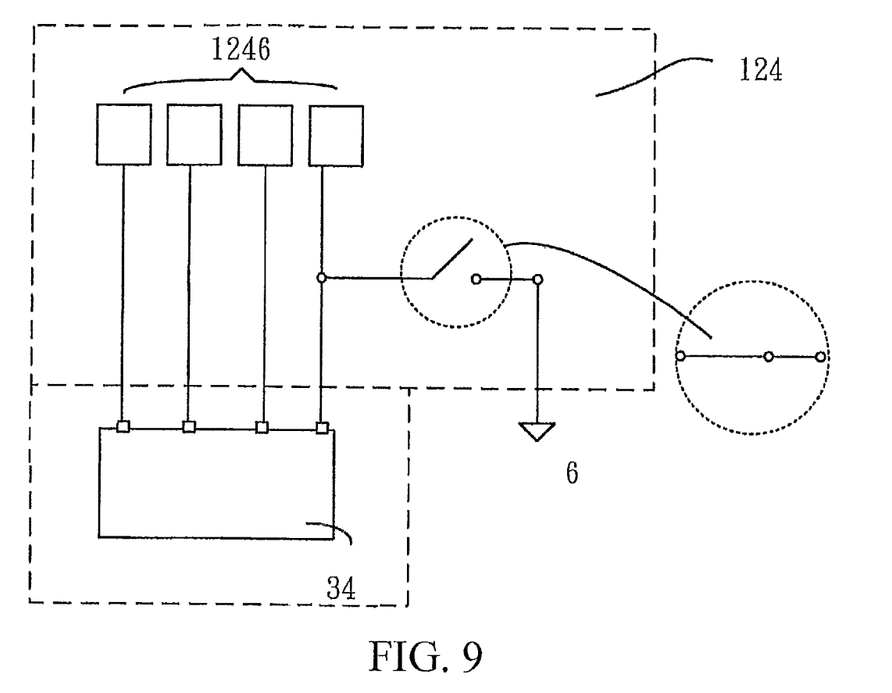
FIG. 9 is a block diagram of a partial structure of a fourth embodiment of the present invention.
Figure 10A:
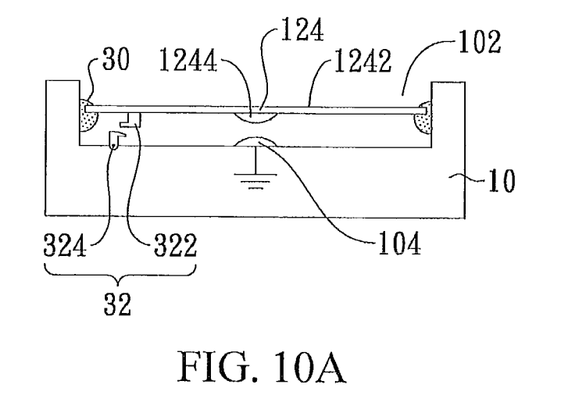
FIG. 10A is a cross-sectional view of a partial structure of the fourth embodiment of the present invention.
Figure 10B:
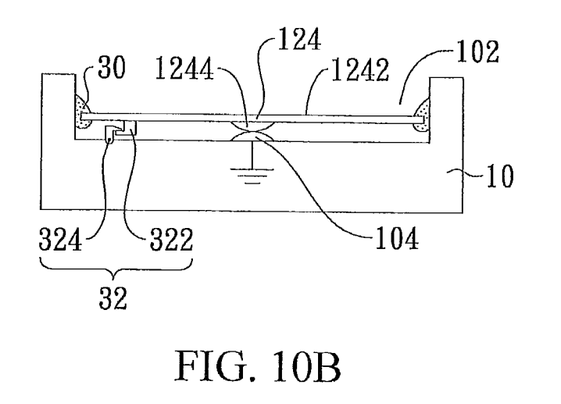
FIG. 10B is a schematic view illustrating operations of the fourth embodiment of the present invention.
Figure 11A:
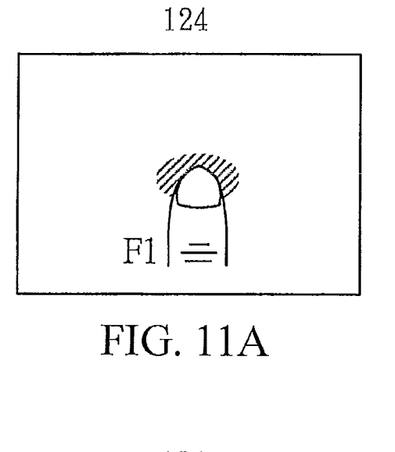
FIGS. 11A-11D are schematic views illustrating operations of a locking/unlocking mechanism according to the fourth embodiment of the present invention.
Figure 11B:
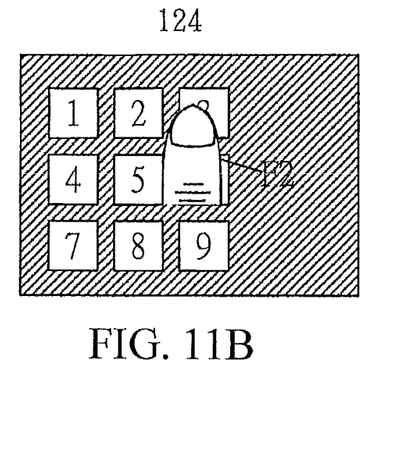
Figure 11C:
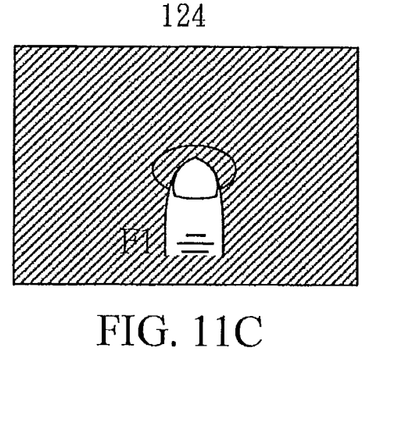
Figure 11D:
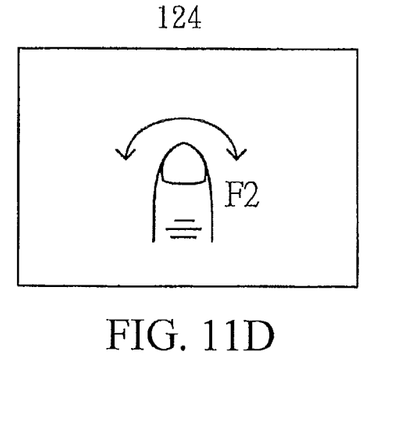

FIGS. 9, 10A, and 10B show a fourth preferred embodiment of the keyboard having a touch input device according to the present invention. As shown in FIGS. 9, 10A, and 10B, in this embodiment, the keyboard body 10 has an accommodation area 102, and a flexible frame 30 is disposed at an inner side edge of the accommodation area 102, so as to bond a touch pad 124 therein. In addition, at least one first conductor 104 is disposed at a bottom portion of the accommodation area, and the first conductor 104 is electrically connected to a constant voltage source, a constant current source, or a ground terminal.

In this embodiment, the touch pad 124 has a touch surface 1242 and at least one second conductor 1244, and each second conductor 1244 is disposed corresponding to the position of one of the first conductors 104. In addition, a plurality of capacitive sensors 1246 is distributed on the touch surface 1242, and the second conductor 1244 is electrically connected to at least one of the capacitive sensors 1246.

In the implementation, since the touch pad 124 is bonded within the flexible frame 30, the flexible frame 30 is deformed when the user presses the touch pad 124, such that one second conductor 1244 (for example, the one located at a bottom end of the touch pad 124 in FIGS. 10A and 10B) contacts and is thus conducted to a corresponding first conductor 104 (for example, the one located at a bottom portion of the accommodation area 102 in FIGS. 10A and 10B).

As shown in FIG. 9, the capacitive sensors 1246 are electrically connected to a controller 34 (the number, position, and configuration shown in FIG. 9 are merely for reference). In use, the controller 34 is used for measuring capacitances of the plurality of capacitive sensors 1246, so as to detect a touch position of at least one conductor (for example, a finger of the user) on the touch pad 124, and further detect a conducting state between the first conductor 104 and the second conductor 1244.

In the implementation, when a conductor (for example, a finger of the user) touches the touch pad 124, and the first conductor 104 and the second conductor 1244 are not conducted, the controller 34 sends a first control signal, for example, a cursor manipulation signal; when a conductor touches the touch pad 124, and the first conductor 104 and the second conductor 1244 are conducted, the controller 34 sends a second control signal, for example, sends a key pressing signal according to a pressing position; and when no conductor touches the touch pad 124, and the first conductor 104 and the second conductor 1244 are conducted, the controller 34 sends a third control signal, for example, a particular button pressing signal.

In addition, in this embodiment, a locking/unlocking mechanism 32 is disposed between the touch pad 124 and the keyboard body 10 for controlling the positioning of the touch pad. As shown in FIG. 10A, the locking/unlocking mechanism 32 includes at least one set of a first element 322 and a second element 324 that can be engaged with each other, in which the first element 322 is disposed at a bottom end of the touch pad 124, and the second element 324 is disposed at a bottom portion of the accommodation area 102.

As shown in FIGS. 10A and 10B, when the user presses the touch pad 124, the first element 322 is buckled to the second element 324, so as to fix the position of the touch pad 124, that is, the contact position between the first conductor 104 and the second conductor 1244 as shown in the figures. When the user intends to unlock the touch pad, the user only needs to press the touch pad once again, and then the first element 322 is released from the second element 324, so that the touch pad 124 returns to its original position.

In operation, as shown in FIGS. 11A to 11D, by pressing the touch pad 124 once with a finger F1, the locking function of the locking/unlocking mechanism 32 can be enabled. In this case, the user can use the finger F1 to perform an operating mode different from an ordinary mouse (for example, the digital input mode). Then, by pressing the touch pad 124 once again, the locking of the locking/unlocking mechanism 32 is released, and the touch pad 124 returns to its original position to perform a mouse operation mode such as cursor movement and other modes such as the gesture or handwriting input mode, without requiring the switching operation through the switching key 14.

Figure 12A:
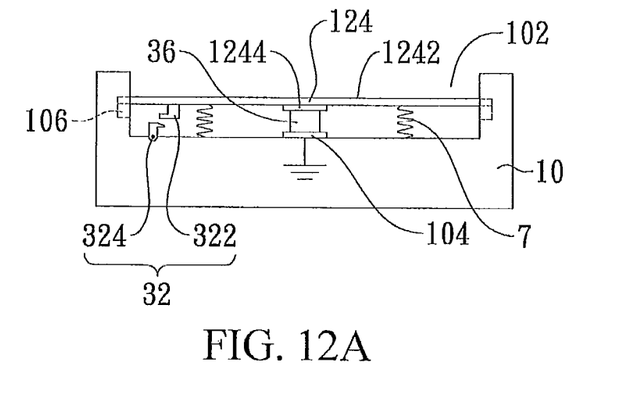
FIG. 12A is a cross-sectional view of a partial structure of a fifth embodiment of the present invention.
Figure 12B:
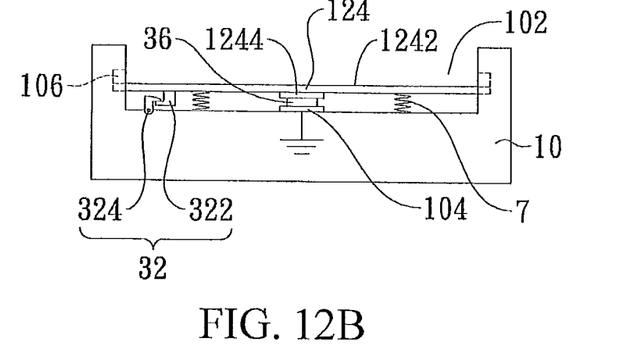
FIG. 12B is a schematic view illustrating operations of the fifth embodiment of the present invention.

FIGS. 12A and 12B show a fifth preferred embodiment of the keyboard having a touch input device according to the present invention. As shown in FIGS. 12A and 12B, compared with the fourth preferred embodiment, in this embodiment, a rail and a spring are used for positioning the touch pad 124, and a switch 36 is further disposed between the first conductor 104 and the second conductor 1244. Thus, when the switch is switched under a force for pressing the touch pad, the first conductor 104 and the second conductor 1244 are conducted.

As shown in FIGS. 12A and 12B, a rail 106 is disposed along an inner side wall of the accommodation area 102 for accommodating the touch pad 124, such that the touch pad 124 moves in a vertical direction. In addition, a spring 7 is disposed between a bottom side of the touch pad 124 and the bottom portion of the accommodation area 102. Thus, when the spring 7 is in an uncompressed state, the spring 7 can support the touch pad 124 upward, such that the touch pad 124 is located at a top portion in the rail 106. Meanwhile, the first conductor 104 and the second conductor 1244 are respectively laminated to two ends of the switch 36, so that all the three elements here contact one another.

When the user presses the touch pad 124, the pressing force compresses the spring 7, such that the touch pad 124 moves downward from the top portion to a bottom portion in the rail 106, and meanwhile, the switch 36 located between the two conductors 104 and 1244 is also started due to being squeezed by the touch pad. In addition, the same as the fourth preferred embodiment, the touch pad 124 can be positioned through the engagement between the first element 322 and the second element 324 of the locking/unlocking mechanism 32, so as to enable the switch to maintain the ON state.

Therefore, the present invention has the following advantages.

1. By bonding the touch input device on the keyboard body, both keyboard input and touch input (executing the digital input mode) functions can be provided for the users.

2. By disposing the switching module on the keyboard body to switch the digital input mode to other different input modes, for example, a cursor control mode, a gesture control mode, or a handwriting input mode, a wide range of applications are provided.

3. By disposing the light source adjacent to a side edge of the insulating layer of the touch pad, and designing the insulating layer as a transparent plate or light guiding plate, the light rays emitted from the light source penetrate the surface of the insulating layer or are guided to the surface of the insulating layer, thereby achieving the surface illumination or aesthetic effect on the touch input device.

4. By using the conducting state between the second conductor on the touch pad and the corresponding first conductor on the keyboard body, different input modes can be triggered by pressing the touch pad without using any switching key, thereby improving the convenience for the users.

In view of the above, the present invention surely can achieve the anticipated objective of providing a keyboard having a touch input device that achieves both keyboard input and touch input functions and maintains a low cost. Therefore, the present invention has industrial applicability, and thus, the present application is filed for a patent according to the law.

The above description and drawings are merely intended to illustrate the embodiments of the present invention. It will be apparent to persons skilled in the art that, equivalent partial variations and modifications can be made without departing from the scope and spirit of the present invention.

What is claimed is:

1. A keyboard having a touch input device, comprising:
    a keyboard body; and
    a touch input device, disposed on the keyboard body, and used in a digital input mode, wherein the touch input device comprises:
        a touch pad comprising a light source emitting light into a light guiding layer for illuminating the touch pad; and
        a pattern layer, bonded to a surface of the touch pad, and having a plurality of key indication areas, wherein each of the key indication areas is corresponding to a key used in the digital input mode, for being recognized and selected by a user, wherein the light source of the touch pad only illuminates the touch pad when the touch input device operates in digital input mode, and does not illuminate the touch pad when the touch input device operates in cursor control mode, gesture control mode, or handwriting input mode.

2. A keyboard having a touch input device, comprising:
    a keyboard body;
    a touch input device, disposed on the keyboard body, wherein the touch input device comprises:
        a touch pad comprising a light source emitting light into a light guiding layer for illuminating the touch pad;
        a pattern layer, bonded to a surface of the touch pad, for being operated and input by a user; and
        a switching module, disposed on the keyboard body, for switching to any one of a digital input mode, a cursor control mode, a gesture control mode, or a handwriting input mode, wherein the light source of the touch pad only illuminates the touch pad when the touch input device is switched to digital input mode, and does not illuminate the touch pad when the touch input device is switched to cursor control mode, gesture control mode, or handwriting input mode.

3. The keyboard having a touch input device according to claim 2, wherein the pattern layer is printed on the surface of the touch pad.

4. The keyboard having a touch input device according to claim 2, wherein the pattern layer is laminated to the surface of the touch pad.

5. The keyboard having a touch input device according to claim 2, wherein the touch pad is a capacitive touch pad.

6. The keyboard having a touch input device according to claim 1, wherein the keyboard body has an accommodation area and at least one first conductor, the touch pad is accommodated in the accommodation area and has a touch surface and at least one second conductor, a plurality of capacitive sensors is distributed on the touch surface, and the second conductor is electrically connected to the capacitive sensors.

7. The keyboard having a touch input device according to claim 6, further comprising a flexible frame disposed between the touch pad and the keyboard body.

8. The keyboard having a touch input device according to claim 6, further comprising at least one rail disposed between the touch pad and the keyboard body.

9. The keyboard having a touch input device according to claim 6, further comprising a touch pad position locking/unlocking mechanism disposed between the touch pad and the keyboard body.

10. The keyboard having a touch input device according to claim 6, wherein the first conductor is electrically connected to a constant voltage source, a constant current source, or a ground terminal.

11. The keyboard having a touch input device according to claim 6, further comprising a controller, for measuring capacitances of the plurality of capacitive sensors, so as to detect a touch position of at least one conductor on the touch pad.

12. The keyboard having a touch input device according to claim 11, wherein the controller is used for measuring capacitances of the plurality of capacitive sensors, so as to detect a conducting state between the first conductor and the second conductor.

13. The keyboard having a touch input device according to claim 12, wherein when a conductor touches the touch pad and the first conductor and the second conductor are not conducted, the controller sends a first control signal.

14. The keyboard having a touch input device according to claim 13, wherein when the conductor touches the touch pad and the first conductor and the second conductor are conducted, the controller sends a second control signal.

15. The keyboard having a touch input device according to claim 6, further comprising a switch disposed between the touch pad and the keyboard body, wherein one end of the switch is connected to the first conductor, the other end of the switch is connected to the second conductor, and the two ends are conducted when the switch is pushed by the touch pad.

16. The keyboard having a touch input device according to claim 2, wherein the keyboard body has an accommodation area and at least one first conductor, the touch pad is accommodated in the accommodation area and has a touch surface and at least one second conductor, a plurality of capacitive sensors is distributed on the touch surface, and the second conductor is electrically connected to the capacitive sensors.

17. The keyboard having a touch input device according to claim 16, further comprising a flexible frame disposed between the touch pad and the keyboard body.

18. The keyboard having a touch input device according to claim 16, further comprising at least one rail disposed between the touch pad and the keyboard body.

19. The keyboard having a touch input device according to claim 16, further comprising a touch pad position locking/unlocking mechanism disposed between the touch pad and the keyboard body.

20. The keyboard having a touch input device according to claim 16, wherein the first conductor is electrically connected to a constant voltage source, a constant current source, or a ground terminal.

21. The keyboard having a touch input device according to claim 16, further comprising a controller, for measuring capacitances of the plurality of capacitive sensors, so as to detect a touch position of at least one conductor on the touch pad.

22. The keyboard having a touch input device according to claim 21, wherein the controller is used for measuring capacitances of the plurality of capacitive sensors, so as to detect a conducting state between the first conductor and the second conductor.

23. The keyboard having a touch input device according to claim 22, wherein when a conductor touches the touch pad and the first conductor and the second conductor are not conducted, the controller sends a first control signal.

24. The keyboard having a touch input device according to claim 23, wherein when the conductor touches the touch pad and the first conductor and the second conductor are conducted, the controller sends a second control signal.

25. The keyboard having a touch input device according to claim 1, wherein the pattern layer is printed on the surface of the touch pad.

26. The keyboard having a touch input device according to claim 1, wherein the pattern layer is laminated to the surface of the touch pad.

27. The keyboard having a touch input device according to claim 1, wherein the touch pad is a capacitive touch pad.

* * * * *